Patented Sept. 30, 1952

2,612,491

UNITED STATES PATENT OFFICE 2,612,491

MIXED POLYCARBOXYLIC ACID ESTERS OF ALKYLIDENE GLYCOLS AND POLYMERS THEREOF

Theodore W. Evans, Oakland, and David E. Adelson, Berkeley, Calif., and Lynwood N. Whitehill, Chicago, Ill., assignors to Shell Development Company, Emeryville, Calif., a corporation of Delaware No Drawing. Application August 25, 1951, Serial No. 243,764

16 Claims. (Cl. 260—78.4)

The present invention relates to a new class of polymerizable unsaturated organic compounds and to the polymers thereof. More particularly, the invention relates to a novel group of polymerizable unsaturated mixed esters and to their homopolymers and copolymers.

Specifically, the invention provides new and particularly useful unsaturated mixed esters which comprise esters of an alkylidene glycol wherein one of the hydroxyl groups has been esterified by a monocarboxylic acid and the other hydroxyl group has been esterified by an acid ester of a polycarboxylic acid and an ethylenically unsaturated monohydric alcohol. The invention further provides valuable polymers obtained by polymerizing the aforedescribed mixed esters by themselves or in combination with other polymerizable ethylenically unsaturated organic compounds.

As a preferred embodiment, the invention provides alpha-alkanoxy-ethyl esters of aliphatic polycarboxylic acids, and preferably alkanedioic and alkanedioic acids, and aryl polycarboxylic acids in which one of the carboxyl groups is esterified by a beta,gamma-ethylenically unsaturated monohydric alcohol, e. g., compounds such as ethylidene acetate allyl maleate, or alpha-acetoxyethyl allyl phthalate, and to their homopolymers and copolymers.

This application is a continuation-in-part of our application Serial No. 738,496, filed March 31, 1947, now abandoned.

It is an object of the invention to provide a new class of polymerizable unsaturated organic compounds. It is a further object to provide novel unsaturated mixed esters of alkylidene glycols and valuable polymers thereof. It is a further object to provide novel unsaturated mixed esters of alkylidene glycols that possess many unique properties which make them particularly useful and valuable in industry. It is a further object to provide novel mixed unsaturated esters of ethylidene glycol that may be polymerized to produce polymers having many unusual and valuable properties. It is a further object to provide unsaturated mixed esters containing a plurality of unsaturated linkages that may be polymerized to produce insoluble, infusible polymers having good flexibility and are crack-free. It is a further object to provide unsaturated mixed esters of ethylidene glycol that may be polymerized to produce polymers having improved stability to light and heat. It is a further object to provide new and particularly useful class of polymeric material. It is a further object to provide unsaturated esters that are particularly valuable as plasticizers. Other objects and advantages of the invention will be apparent from the following detailed description thereof.

It has now been discovered that these and other objects are accomplished by the novel unsaturated mixed esters of the invention comprising esters of an alkylidene glycol wherein one of the hydroxyl groups of the alkylidene glycol molecule has been esterified with a monocarboxylic acid and the other hydroxyl group has been esterified with an acid ester of a polycarboxylic acid and an ethylenically unsaturated monohydric alcohol, and polymers thereof obtained by polymerizing the said esters by themselves or with other polymerizable unsaturated compounds in a variety of proportions. The unique structural arrangement of these particular esters has been found to endow the said compounds with unexpected physical and chemical properties which make them particularly useful and valuable both in their monomeric and polymeric forms. Certain of the polymers, for example, exhibit properties which are in many respects totally unlike the properties that could be anticipated by analogy from a consideration of the properties of known compounds having structural similarities.

The polymers prepared from the unsaturated mixed esters of the invention which possess a plurality of polymerizable linkages have been found, for example, to have the unexpected property of forming insoluble and infusible solid polymers which are not only flexible and entirely crack-free, but which exhibit marked color stability on long exposure to direct sunlight. Such polymers are ideally suited for use in preparing molded articles, such as buttons, caps, gears, etc. which must be strong and be able to withstand considerable off-side pressure. That polymers of these particular monomers possessed such properties was quite surprising in view of the fact that polymers prepared from other monomers possessing a plurality of non-conjugated polymerizable linkages, such as diallyl phthalate, as well as related ethylidene glycol monomers, such as ethylidene dimethacrylate, are very brittle and easily cracked due to the strain set up within the resinous mass during the curing process. In addition, these prior known polymers generally possess poor resistance to heat and light and are easily discolored when exposed for extended periods of time to these elements.

The polymers prepared from the unsaturated mixed esters of the invention which possess only a single polymerizable linkage have been found to possess an unexpectedly high degree of compatibility with common resinous materials, such as polyvinyl chloride, polyvinyl acetate, polystyrene, and the cellulose derivatives, such as nitrocellulose, cellulose acetate, cellulose acetate butyrate, and cellulose butyrate, and can be used in combination therewith as plasticizers or resin additives.

The unsaturated mixed esters of the invention have boiling points which are in general well above 100° C. at pressures of 1 mm. or less and exhibit wide ranges of miscibility and compatibility with coating solvents, lubricating stocks, resins, etc. and are suited for use as plasticizers, lubricating oil additives, asphalt adhesive agents, water-proofing agents for silica-gel greases, pour point depressants, viscosity index improvers, textile lubricants, and resin lubricants or plasticizers.

The unsaturated mixed esters of the present invention may be described as esters of an alkylidene glycol, such as ethylidene glycol, wherein one of the hydroxyl groups has been esterified with a monocarboxylic acid and the other hydroxyl group has been esterified with an acid ester of a polycarboxylic acid and an ethylenically unsaturated monohydric alcohol.

The monocarboxylic acids used to esterify one of the hydroxyl groups of the alklidene glycol molecule may be saturated, unsaturated, aliphatic, alicyclic, heterocyclic or aromatic and may be substituted if desired with non-interfering substituents, such as halogen atoms, alkoxy radicals, and the like. The acids may also contain oxy, thio, sulfinyl or sulfonyl linkages within their molecule. Illustrative examples of the monocarboxylic acids are acetic, propionic, caproic, butyric, valeric, enanthic, acrylic, caprylic, methacrylic, pelargonic, capric, lauric, myristic, palmitic, stearic, arachidic, angelic, sorbic, hydrosorbic, 2-octenoic, 2,8-decadienoic, cyclohexanoic, cyclopentenoic, picolinic, nicotinic, beta-ketobutyric, 2-nitropentanoic, 3-hydroxypentanoic, cyclohexaneacetic, cyclohexanoic, methylthiopropionic, butylsulfonylpropionic, benzyloxyacetic, ethylhexyloxyacetic, cyclohexylthiopropionic, phenylthioacetic, and chlorophenylthiopropionic acid. Preferred monocarboxylic acids are the aliphaticmonocarboxylic acids containing from 1 to 15 carbon atoms.

Particularly preferred monocarboxylic acids are the hydrocarbon monocarboxylic acids containing from 1 to 12 carbon atoms, and the oxy-, thio-, sulfinyl- and sulfonyl-substituted aliphatic hydrocarbon monocarboxylic acids, containing from 1 to 14 carbon atoms such as acids of the formula RCOOH, RORCOOH, RSRCOOH, RSORCOOH and $RSO_2RCOOH$ wherein R is a hydrocarbon radical. Especially preferred monocarboxylic acids are the alkanoic acids and alkenoic acids containing from 1 to 6 carbon atoms, the alkyloxyalkanoic acids, alkylthioalkanoic acids, alkylsulfinylalkanoic acids, and the alkylsulfonylalkanoic acids containing from 1 to 8 carbon atoms.

Of special interest, particularly because of the fine quality of the polymers prepared from the resulting esters, are the alkenoic acids, preferably containing from 1 to 6 carbon atoms.

The other hydroxyl group on the alkylidene glycol molecule is esterified with an acid ester of a polycarboxylic acid and an ethylenically unsaturated monohydric alcohol. The polycarboxylic acids used in producing these acid esters may contain two, three, four or more carboxyl groups and may be saturated, unsaturated, aliphatic, alicyclic, heterocyclic or aromatic. They may also be substituted if desired with non-interfering substituents, such as halogen atoms, alkoxy radicals, and the like. The polycarboxylic acids may, and in some cases preferably do, contain oxy, thio, sulfinyl or sulfonyl linkages within their molecule. Illustrative examples of the polycarboxylic acids are malonic, succinic, adipic, pimelic, ketopimelic, suberic, azelaic, brassylic, sebacic, dibromosuccinic, chloroadipic, maleic, fumaric, glutaconic, alpha-hydromuconic, glutaric, alpha,beta-diethylsuccinic, 2,5-heptadienedioic, 3-hexynedioic, 1,1,5-pentanetricarboxylic, 5-octene-3,3,6-tricarboxylic, tricarballylic, phthalic, isophthalic, terephthalic, tetrachlorophthalic, hemimellitic, 1,4-cyclohexanedicarboxylic, naphthalic, dinicotinic, acridinic, cinnamic, mellophanic, mellitic, 1,5-dyclohexanedicarboxylic dibromophthalic, acetoxyglutaric, dichloroglutaconic, 3,3'-thiodipropionic, 4,4'-sulfonyldibutyric, 3,3'-oxydipropionic, decamethylene-1,10-dioxyacetic, hexamethylene-1,6-dioxyacetic, pentamethylene-1,5-dioxypropionic, 5,5'-thiodidecanoic, 6,6'-sulfinyldioctadecanoic, and hexamethylene-1,6-dithiopropionic acid. Preferred polycarboxylic acids are the dicarboxylic acids containing from 2 to 18 carbon atoms.

Particularly preferred polycarboxylic acids are the hydrocarbon dicarboxylic acids containing from 2 to 12 carbon atoms, and the oxy-, thio-, sulfinyl- and sulfonyl-substituted dicarboxylic acids containing from 2 to 12 carbon atoms, such as acids of the formula HOOCRCOOH, HOOCRORCOOH, HOOCRSRCOOH, HOOCRSORCOOH, and $HOOCRSO_2RCOOH$, wherein R is a hydrocarbon radical. Especially preferred polycarboxylic acids are the aryl dicarboxylic acids containing from 8 to 14 carbon atoms wherein the carboxyl groups are attached directly to the aromatic ring, the alkanedioic acids containing from 2 to 10 carbon atoms, the alkenedioic acids containing from 2 to 10 carbon atoms, the oxydialkanoic acids, the thio-dialkanoic acids, the sulfinyldialkanoic acids, and the sulfonyldialkanoic acids containing from 2 to 10 carbon atoms.

Of special interest, particularly because of the fine quality of the polymers prepared from the resulting esters, are the unsaturated dicarboxylic acids, such as maleic acid, fumaric acid, and the like, and more particularly the alkenedioic acids containing from 2 to 10 carbon atoms.

The unsaturated alcohols used in producing the acid esters of the above-described polycarboxylic acids are those monohydric alcohols containing at least one polymerizable ethylenic linkage, preferably not more than four carbon atoms removed from the terminal hydroxyl group. Particularly preferred alcohols to be used for this purpose are the allyl-type alcohols, i. e., the beta,gamma-ethylenically unsaturated monohydric alcohols. These alcohols may be exemplified by allyl alcohol, crotyl alcohol, tiglyl alcohol, 3-chloro-2-buten-1-ol, cinnamyl alcohol, 2,4-hexadien-1-ol, 2-methyl-2-hexen-1-ol, 5-chloro-2-octen-1-ol, 3-cyclohexyl-2-octen-1-ol, 4-phenyl-2-hepten-1-ol, 2,4-dichloro-2-hexen-1-ol, and 3-ethyl-2-octen-1-ol. Particularly preferred alcohols to be used are the beta,gamma-ethylenically unsaturated aliphatic monohydric alcohols containing from 3 to 15 carbon atoms. Of special interest are the alken-2-ols containing from 3 to 8 carbon atoms.

If the polycarboxylic acid has more than two carboxyl groups, the carboxyl groups other than the free carboxyl group and the one esterified with the above-described unsaturated alcohol may be esterified with the same or different unsaturated alcohol or a saturated monohydric alcohol, such as methanol, ethanol, butanol, amyl alcohol, octyl alcohol, decyl alcohol, and the like. Preferred saturated alcohols to be used for this purpose are the alkanols containing from 1 to 8 carbon atoms.

The acid esters used in producing the novel unsaturated esters of the invention are those obtained by esterifying all but one of the carboxyl groups of the above-described polycarboxylic acids with any one of the above-described unsaturated monohydric alcohols or two or more of the unsaturated alcohols or one or more of the unsaturated alcohols and the above-described saturated alcohols. Examples of such acid esters include allyl hydrogen maleate, allyl hydrogen succinate, allyl hydrogen adipate, allyl hydrogen phthalate, methallyl hydrogen glycolate, chloroallyl hydrogen thiodipropionate, 2-hexenyl hydrogen oxydipropionate, 2-butenyl hydrogen sulfonyl-dibutyrate, methallyl hydrogen sulfinyl-dihexenoate, allyl butyl hydrogen 1,3,5-pentanetricarboxylate, and the like.

The novel unsaturated mixed esters of the invention are the esters of an alkylidene glycol wherein one of the hydroxyl groups has been esterified with any one of the above-described monocarboxylic acids and the other hydroxyl group has been esterified with any one of the above-described acid esters of the polycarboxylic acids and the unsaturated alcohols. Examples of the novel mixed esters include Ethylidene propionate allyl oxalate
Ethylidene propionate ethallyl methylsuccinate
Ethylidene butylate allyl adipate
Ethylidene formate allyl sebaciate
Ethylidene acetate methallyl naphthalenedicarboxylate
Ethylidene formate methallyl succinate
Ethylidene butyrate methallyl adipate
Ethylidene butyrate allyl azeliate
Ethylidene butyrate ethallyl methyl phthalate
Ethylidene acetate allyl oxalate
Ethylidene acetate allyl succinate
Ethylidene propionate methallyl glutarate
Ethylidene butyrate ethallyl pimelate
Ethylidene formate methallyl azeliate
Ethylidene propionate methallyl hydrophthalate
Ethylidene butyrate methallyl methylmaleate
Ethylidene acetate allyl glutaconate
Ethylidene formate allyl glutaconate
Ethylidene propionate penten-1-ol-3 glutaconate
Ethylidene propionate 3 - methyl - penten-1-ol-3-glutaconate
Ethylidene acetate diallyl 1,3,5 - pentane - tricarboxylate
Ethylidene acetate allyl butyl 1,3,5-pentane-tricarboxylate Particularly preferred unsaturated esters of the present invention are those containing at least two polymerizable ethylenic linkages. One group of such compounds comprises the alkylidene glycol mixed diesters of saturated monocarboxylic acids and the acid esters of ethylenically unsaturated polycarboxylic acids and ethylenically unsaturated monohydric alcohols. Another group of such compounds comprises the alkylidene glycol mixed esters of saturated monocarboxylic acids and the acid esters of polycarboxylic acids containing at least three carboxyl groups, at least two of which are esterified with ethylenically unsaturated alcohols. Still another group of such compounds comprises the alkylidene glycol mixed esters of unsaturated monocarboxylic acids and the acid esters of polycarboxylic acids and ethylenically unsaturated monohydric alcohols. Examples of such compounds include Ethylidene acrylate allyl phthalate
Ethylidene methacrylate allyl succinate
Ethylidene acetate diallyl 1,3,5 - pentane - tricarboxylate
Ethylidene propionate dimethallyl 1,2,4 - hexanetricarboxylate
Ethylidene acetate allyl maleate
Ethylidene propionate allyl maleate
Ethylidene acetate allyl dimethylmaleate
Ethylidene butyrate allyl dimethylmaleate
Ethylidene acetate dimethallyl dimethacrylate
Ethylidene butyrate allyl citraconate
Ethylidene acetate ethallyl citraconate
Ethylidene dimethylacetate methallyl itaconate
Ethylidene acetate buten-1-ol-3 itaconate
Ethylidene acetate 3 - methyl - penten-1-ol-3 itaconate
Ethylidene propionate allyl dimethacrylate
Ethylidene formate methallyl dimethylacrylate
Ethylidene acetate hepten - 1 - ol-3 dimethylacrylate
Ethylidene propionate methallyl ethylmaleate
Ethylidene acetate allyl ethylmaleate
Ethylidene butyrate tiglyl ethylmaleate
Ethylidene butyrate ethallyl methylmaleate Of special interest are the unsaturated mixed esters of the general formula

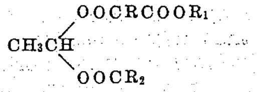

wherein R is a bivalent aliphatic or aromatic hydrocarbon radical, such as a bivalent alkyl, alkenyl or aryl radical, $R_1$ is an alkenyl radical, preferably not more than six carbon atoms, and $R_2$ is a hydrocarbon radical, and preferably an alkyl, alkenyl or aryl radical.

The unsaturated mixed esters of the invention may be prepared by a variety of methods. A method that has been found particularly suitable for use in preparing the novel mixed esters comprises reacting (1) an acid ester of a polycarboxylic acid with (2) an ester of an ethylenically unsaturated monohydric alcohol and a monocarboxylic acid in the presence of an acid catalyst and preferably in the presence of a polymerization inhibitor. This method of preparation may be illustrated by the following reaction showing the preparation of ethylidene acetate allyl succinate by reacting allyl hydrogen succinate with vinyl acetate;

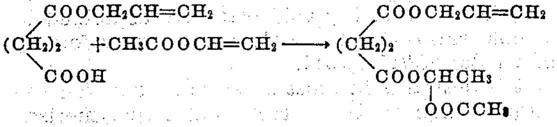

When prepared by this method, there is a possibility that the formed unsaturated mixed esters may undergo decomposition by splitting out a molecule of the monocarboxylic acid to form a poly unsaturated ester. Thus, ethylidene acetate allyl succinate may undergo decomposition to form acetic acid and vinyl allyl succinate. Care should therefore be taken during the reaction to prevent or minimize this type of decomposition. The decomposition may be prevented or greatly reduced by controlling the reaction period and the reaction temperature and/or by avoiding any removal of the decomposition products as indicated in detail below.

The acid esters of the polycarboxylic acids used in this reaction may be any of those described hereinabove in the section dealing with the description of the novel esters of the invention. The esters of the monocarboxylic acids to be employed may be any of those obtained by esterifying any of the above-described monocarboxylic acids and any of the above-described unsaturated monohydric alcohols, and preferably the 1-alkenols, such as vinyl alcohol and the like.

A wide variety of catalysts may be used in the process. In general, the most desirable catalyst are those that have been used in the formation of vinyl esters from acetylene. Particularly suitable catalysts are the acids, such as sulfuric acid, phosphoric acid and silicotungstic acid, and these acids used in conjunction with metal compounds, such as mercuric salts, copper acetate, vanadium pentoxide, ferric dichromate, ferric oxide, ceric acid sulfate, and the like. Especially preferred catalysts are the mercury salts of the strong acids. For the best results, these catalysts are prepared directly in the reaction solution by initially introducing the mercuric salts, such as mercuric acetate, and then adding the strong acid to convert the salt into the desired salt of the strong acid. Depending in part on the particular catalyst-forming acid used, it may be of advantage to add less of the acid than is required to form the normal mercury salt, and as little as half of this quantity has been used successfully. At the same time an excess of the acid may in some instances be desirable. Other acids that may be used in preparing these mercury salts include phosphoric acid, silicotungstic acid boron trifluoride-carboxylic acid, and other heteropoly acids. Hydrochloric acid may be used in some reactions.

Sufficient catalyst should be used to insure that the reaction will be accomplished in the desired short reaction period. As indicated below, long reaction periods give rise to the formation of relatively large quantities of the undesired decomposition products and should be avoided. The amount of the catalyst employed should be at least about 1% by weight of the acid ester of the polycarboxylic acid, and preferably between 1% to 2.5% by weight of the said acid ester.

The proportions of the acid ester of the polycarboxylic acid and the unsaturated ester of the monocarboxylic acid to be used in the above-described process may vary over a considerable range. In most cases, it is desirable to provide a substantial excess of the unsaturated ester of the monocarboxylic acid over the acid ester. Preferably the unsaturated ester of the monocarboxylic acid and the acid ester are combined in a mole ratio of 8:1 to 4:1, and more preferably in a ratio of 7:1 to 5:1.

It is desirable in most cases to accomplish the esterification in the presence of a polymerization inhibitor, such as copper bronze powder, sulfur, p-phenylenediamine, hydroquinone, tannic acid and various amino and sulfur compounds. These inhibitors may be subsequently removed by washing, distillation, extraction, and the like.

The temperatures employed in the reaction should not be excessive as high temperatures favor the decomposition of the desired mixed unsaturated esters as indicated above. The reaction can generally be conducted at the reflux temperature of the reaction mixture without causing excessive decomposition but temperatures much above that range should be avoided. Preferred temperatures range from room temperature to 90° C., and more preferably from 30° C. to 70° C. Atmospheric, superatmospheric or subatmospheric pressure may be used as desired.

The reaction should also be relatively short so as to avoid excessive decomposition of the unsaturated mixed esters. In most instances, the reaction period should not be in excess of 3.5 hours. Preferred reaction periods range from .5 to 2.5 hours.

Care should also be taken during the reaction to avoid any removal of the decomposition end products, such as the monocarboxylic acid, which would tend to drive the decomposition reaction to the right.

At the end of the reaction period, the activity of the catalyst may be reduced or destroyed by the addition of suitable additives, such as sodium acetate, and the reaction mixture may then be subjected to a separation process to recover the desired mixed unsaturated esters. If the separation is accomplished by distillation, the novel unsaturated mixed esters of the invention will probably be recovered as the highest boiling residues, while the decomposition products and unreacted components will generally be recovered at the lower temperatures.

The novel unsaturated mixed diesters of the invention are relatively colorless mobile to viscous liquids or semi-solids. The esters have boiling points which are in general above 100° C. at pressure of 1 mm. or less and they exhibit wide ranges of miscibility and compatibility with various oils, resins and the like. They have excellent compatibility with polymers such as polyvinyl chloride, polyvinyl esters, such as polyvinyl acetate, cellulose esters, such as cellulose acetate, cellulose ethers, such as ethyl cellulose, and polymethyl methacrylate, polystyrene and make excellent plasticizers for these materials. As indicated above, they are also of value as lubricating oil additives, asphalt adhesive agents, pour point depressants, etc.

The novel unsaturated mixed esters of the invention are particularly valuable in the preparation of polymeric materials as they can be polymerized alone or copolymerized with other polymerizable organic compounds to produce valuable polymeric material. Monomers to be copolymerized with the esters include the vinyl monomers containing a polymerizable ethylenic linkage, such as styrene, vinyl halides, vinylidene halides, vinyl esters of organic acids, methyl methacrylate, methyl acrylate, allyl halides, allyl esters of organic acids, olefinic organic acid esters of saturated alcohols, etc., and other polymerizable compounds containing in the molecule one or more polymerizable organic radicals and one or a plurality of inorganic radicals or elements such as vinyl, allyl, metallyl, etc., esters of phosphoric acid, ortho acids of silicon, boron, etc., as well as compounds containing a plurality of conjugated polymerizable carbon-to-carbon linkages such as butadiene conjugated chlorobutadiene, isoprene, other conjugated pentadienes, etc. Particularly valuable copolymerization products are obtained by the polymerization of the esters of the invention with polymerizable vinyl derivatives containing a single polymerizable unsaturated linkage.

By virtue of their multiplicity of functional groups the compounds of the present invention are miscible over a wide range of proportions and therefore undergo interpolymerization with the majority of polymerizable compounds, thus forming polymers containing a residue of each of the monomers. However, in certain cases novel and valuable effects are obtained by exceeding the miscibility range of the monomers, thereby forming copolymerization products in which interpolymerization occurs to a more or less limited extent. The compounds of the invention may also be separately partially polymerized or mixed with partially polymerized monomers of another material followed by the completion of the copolymerization, or copolymerized by any of the various other techniques commonly practiced in the art.

The oxygen-containing polymerization catalysts are effective in accelerating the polymerization of the compounds of the invention. Illustrative examples of such catalysts are benzoyl peroxide, acetyl peroxide, acetyl benzoyl peroxide, lauryl peroxide, dibutyl peroxide, succinyl peroxide, sodium peroxide, barium peroxide, tertiary alkyl hydroperoxides such as tertiary butyl hydroperoxide, peracetic acid, perphthalic acid, perborates, ozone and oxygen. Another class of polymerization catalysts which are effective is the di(tertiary alkyl)peroxides such as di(tertiary) butyl peroxide. The polymerization may be accomplished in the presence of mixtures of polymerization catalysts as benzoyl peroxide and hydrogen peroxide, for example, or it may be accomplished in the presence of both a catalyst and a polymerization inhibitor.

The polymerization may be readily accomplished at moderately elevated temperatures, the range of temperatures between about 60° C. and 150° C. being particularly effective. In certain cases polymerization may be energized by light. The monomers may be polymerized while dispersed in a solvent, which is preferably immiscible with the catalyst, or may be polymerized in solution, in mass, or, in certain cases, in the vapor state. The process may be conducted continuously or intermittently and at normal, reduced or superatmospheric pressures under the normal atmosphere of the room or under a blanket of an inert gas. The polymerization may be interrupted before completion, thus resulting in the formation of partial polymers which are usually viscous somewhat fluid masses suitable for transferring to molds, or for impregnating porous materials and the like prior to completing the polymerization to solid plastic materials.

The novel esters of the invention which contain two or more polymerizable olefinic linkages may be first polymerized into a polymer of substantially a linear structure and the polymerization interrupted at this point. While the polymerization normally continues to form insoluble infusible solid polymers by the formation of interlinkages between the chain, it is often advantageous to interrupt the reaction at the first step and form the soluble and fusible linear polymer into the desired shapes before completing the polymerization. The interruption of the polymerization reaction may be accomplished by any suitable method, such as a sudden cooling of the polymerizing mass by introducing a cold solvent into the reaction mixture. When the polymerization is arrested by the addition of diluent, it is advantageous to select a solvent for the monomer in which the fusible polymer is insoluble, thereby readily accomplishing the separation of the fusible polymer from the unreacted monomer by selective solvation. The fusible polymer may also be separated by distillation at reduced pressures, preferably in the presence of a polymerization inhibitor, and may be stored in the presence of the inhibitor for long periods of time.

The separated fusible polymer may be transferred to a mold, applied as a surface coating, or given any desired shape employing the methods common to the art such as dissolving or dispersing the polymer in a solvent or swelling agent. The second step or completion of the polymerization reaction may then be accomplished by the application of heat, light, pressure, in general, by the reapplication of the conditions, or usually slightly more severe conditions than were applied to accomplish the partial polymerization. In most cases sufficient polymerization catalyst will remain occluded in the fusible polymer to accomplish the infusibilization polymerization, but wherever it is practical or desirable, additional amounts of the same or a different catalyst may be employed. In certain cases, such as extrusion, injection or transfer molding, or the like, the steps of shaping and infusibilization of the fusible polymer will occur concurrently and the unsaturated esters of the invention are therefore particularly adapted to molding methods of this general type.

Illustrative examples of the preparation and polymerization of certain of the compounds of the invention are given below; it is to be understood, however, that the examples are given for the purposes of illustration only and the invention is not to be considered as limited to the particular details recited in the examples.

*Example I*

A mixture comprising 9.55 moles of allyl hydrogen maleate, 58 moles of vinyl acetate, 3 parts of tannic acid, 19.2 parts of mercuric acetate and 4.4 parts of 90% sulfuric acid was refluxed for about 3.5 hours at normal atmospheric pressure. The mixture was then cooled and the activity of the catalyst reduced by shaking the mixture with 21 parts of sodium acetate, and then filtering. Vinyl acetate was then removed at the end of process by distillation under reduced pressure and the residue dissolved in carbon tetrachloride. The carbon tetrachloride solution was washed with sodium carbonate, dried over sodium sulfate and distilled under reduced pressure in the presence of 2 parts of tannic chloride. The first fraction recovered at 46° C. (0.25 mm.) was identified as allyl vinyl maleate. The mixture was then further distilled at 70° C. to 109° C. at a 1 mm. pressure to recover 261 parts of product. On redistillation, 139 parts of a clear liquid was recovered at 109° C. at 1 mm. pressure. This product was identified as ethylidene acetate allyl maleate having the following formula:

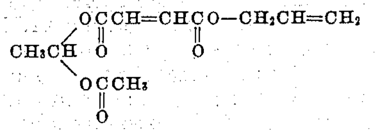

Percent carbon:

| | |
|---|---|
| Found | 54.6(9) / 54.6(1) |
| Calculated | 54.6 |

Iodine number (Wij):

| | |
|---|---|
| Found | 114–115 |
| Calculated | 105 |

| | |
|---|---|
| Percent hydrogen: | |
| Found | 5.93, 5.88 |
| Calculated | 5.84 |
| Specific gravity | 1.139 |
| $n_D^{20}$ | 1.4561 |

The above-described process was repeated using a reaction time of 1½ hours and a reaction temperature of 60° C. The formation of the decomposition product allyl vinyl maleate was greatly reduced under such conditions.

*Example II*

A sheet of ethylidene acetate allyl maleate was cast at 65° C. for 144 hours in the presence of 2 per cent by weight of benzoyl peroxide. The resultant polymer was found to have a gel time of only 5.7 hours and formed a transparent infusible and insoluble coating which was entirely free of cracks and exhibited a remarkable color stability under the influence of direct sunlight. The physical properties of the resultant casting are listed below:

| | |
|---|---|
| Edgewise compression strength | 20,800 p. s. i. |
| Percent deformed at ultimate point | 26.3 |
| Yield point on compression | 13,000 p. s. i. |
| Percent deformed at yield point | 4.9 |
| Flexural strength | 8,300 |
| Modulus in flexure | 0.38 p. s. i. $\times 10^{-6}$ |
| Dynstate impact strength | 7 kg/cm.$^2$ |
| Rockwell hardness, "M" scale | 103 |
| Percent transmission at 425 mμ [1] | 74 |
| Percent transmission at 425 mμ [1] | 67 after 7 days' exposure to direct sunlight |
| Percent transmission at 425 mμ [1] | 68 after 35 days' exposure to direct sunlight |
| Density, 20/4 | 1.319 |
| Refractive index, $n_D^{20}$ | 1.4957 |
| Refractive dispersion $(n_f - n_c) \times 10^{-4}$ | 178 |

[1] The light transmissions were measured relative to air on samples of approximately 4 mm. in thickness, and are therefore not absolute values, 92% being the highest theoretical value obtainable under these conditions.

*Example III*

A mixture containing 10 moles of allyl hydrogen phthalate, 50 moles of vinyl acetate, 2 parts of stannic chloride, 19.2 parts of mercuric acetate and 4.4 parts of 90% sulfuric acid was refluxed for 2 hours at normal atmospheric pressure. The mixture was then cooled and allowed to stand overnight. The resulting product was then mixed with 21 parts of sodium acetate to destroy the activity of the catalyst and the mixture was filtered. Vinyl acetate was then removed by distillation under reduced pressure and the residue was dissolved in isopropyl ether and washed free of acid with potassium carbonate solution. The ether solution was then dried over calcium chloride and distilled. The vinyl acetate was removed by flash distillation at 90° C. The next fraction boiled at 104 to 106° C. at 0.8 mm. and was identified as allyl vinyl phthalate. The last fraction containing the desired mixed ester was removed at 145° C. to 147° C. at 0.5 mm. On redistillation a clear white liquid was recovered at 145° C. which was identified as ethylidene acetate allyl phthalate.

| | |
|---|---|
| Percent carbon: | |
| Found | 62.21 |
| Calculated | 61.6 |
| Percent hydrogen: | |
| Found | 5.50 |
| Calculated | 5.52 |
| Bromine number in grams of brimine equivalent to 100 g. of sample: | |
| Found | 53 |
| Calculated | 54.6 |
| Ester value in equivalents per 100 grams of sample: | |
| Found | 0.968 and 0.971 |
| Calculated | 0.973 |
| Refractive index, $n_D^{20}$ | 1.5040 |
| Acidity in equivalents per 100 grams of sample | 0.042 and 0.045 |

The above process was repeated using a reaction time of only about 1½ hours and a reaction temperature of about 50° C. The formation of the alkyl vinyl phthalate was greatly reduced under such conditions.

The process was repeated with the use of the following catalysts. The amount of the ethylidene acetate allyl phthalate recovered in each case is shown in the last column.

| No. | Catalyst | g. (mole) Cat. Used | Hrs. Reflux | Ethylidene acetate allyl phthalate |
|---|---|---|---|---|
| | | | | *Percent* |
| 1 | $Fe_2O_3$ / $H_2SO_4$ | 0.025 / 0.020(5) | 8 | 56.8 |
| 2 | p-toluene sulfonic acid | 0.025 | 8 | 49.6 |
| 3 | $H_2SO_4$ | 0.020(5) | 8 | 58.9 |
| 4 | $Ce(SO_4)_4$ | 0.025 | 8 | 67.9 |
| 5 | $Cu(C_2H_3O_2)_2H_2O$ / $H_2SO_4$ | 0.025 / 0.020(5) | 8 | 40.4 |
| 6 | $Cu(C_2H_3O_2)_2H_2O$ / $H_2SO_4$ | 0.025 / 0.020(5) | 3 | 43.8 |
| 7 | $V_2O_5$ / $H_2SO_4$ | 0.025 / 0.020(5) | 8 | 64.8 |
| 8 | $V_2O_5$ / $H_2SO_4$ | 0.025 / 0.020(5) | 24 (at 100 m.) | 35.6 |
| 9 | $Fe_2(Cr_2O_7)_3$ / $H_2SO_4$ | 0.017 / 0.020(5) | 8 | 57.9 |

*Example IV*

The ethylidene acetate allyl phthalate produced in the above example is mixed with 2% benzoyl peroxide and heated at 65° C. for over 144 hours. The resulting polymer was a viscous liquid which was compatible with poly(vinyl chloride) and nitrocellulose.

*Example V*

A mixture containing 9.55 moles of allyl hydrogen phthalate, 50 moles of vinyl formate, 3 parts of tannic acid, 19 parts of mercuric acetate and 5 parts of 90% sulfuric acid was refluxed for about 2 hours at normal atmospheric pressure. The activity of the catalyst was destroyed by treating with sodium acetate and the mixture was allowed to stand overnight. The mixture was distilled to remove the vinyl formate and the resdue then dissolved in isopropyl ether and washed free of acid with potassium carbonate solution. The ether soltuion was then dried over calcium chloride and distilled. The first reaction removed comprised allyl vinyl phthalate and the desired ethylidene formate allyl phthalate was removed in the next fraction as a high boiling substantially colorless liquid.

Similar mixed esters are obtained by replacing the allyl hydrogen phthalate in the above-described process with equivalent amounts of each of the following acid esters: methallyl hydrogen adipate, chloroallyl hydrogen malonate, 2-hexenyl hydrogen glutarate, and 2-heptenyl hydrogen chlorosuccinate.

*Example VI*

A mixture containing 9.55 moles of allyl hydrogen phthalate, 50 moles of vinyl propionate, 3 parts of tannic acid, 19 parts of mercuric acetate and 5 parts of 90% sulfuric acid was refluxed for two hours at normal atmospheric pressure. The activity of the catalyst was destroyed by treating with sodium acetate and the mixture was allowed to stand overnight. The mixture was then distilled to remove the vinyl propionate and the residue then dissolved in isopropyl ether and washed free of acid. The ether solution was then dried and distilled. The first product removed comprised allyl vinyl phthalate and then the desired ethylidene propionate allyl phthalate was removed in the next fraction as a high boiling substantially colorless liquid.

*Example VII*

A mixture containing 9 moles of allyl hydrogen thiodipropionate, 50 moles of vinyl acetate, 3 parts of tannic acid, 19 parts of mercuric acetate and 5 parts of 90% sulfuric acid is refluxed for 2 hours at normal atmospheric pressure. The catalyst is destroyed as in the previous example and the mixture distilled to remove the vinyl acetate. On further distillation, allyl vinyl thiodipropionate is recovered, and then ethylidene acetate allyl thiodipropionate is recovered in the final fraction.

The ethylidene acetate allyl thiodipropionate produced above is mixed with 2% benzoyl peroxide and the mixture heated at 65° C. The resulting polymer is a viscous liquid that is soluble in a variety of solvents and is compatible with poly(vinyl chloride).

Unsaturated esters having similar properties are obtained by replacing allyl hydrogen thiodipropionate in the above process with equivalent amounts of each of the following acid esters: allyl hydrogen sulfonyldipropionate, allyl hydrogen sulfonyl dibutyrate, 2-hexenyl hydrogen thiodioctanoate, and 2-octenyl hydrogen thiodibutenoate.

*Example VII*

Ethylidene propionate allyl diglycolate was produced by heating a mixture containing 9 moles of allyl hydrogen diglycolate, 50 moles of vinyl propionate, 3 parts of tannic acid, 19 parts of mercuric acetate and 5 parts of 90% sulfuric acid at 90° C. for 2 hours, and then removing the catalyst, vinyl propionate and decomposition products as shown in the preceding example.

Similar esters are obtained by replacing the allyl hydrogen diglycolate in the above process with equivalent amounts of each of the following acid esters: methallyl hydrogen diglycolate, methallyl hydrogen oxydipentanoate, chloroallyl hydrogen oxydioctanoate, and the like.

We claim as our invention:

1. A mixed ester which may be represented as an ester of an ethylidene glycol wherein one of the hydroxyl groups of the ethylidene glycol molecule has been esterified with a monocarboxylic acid and the other hydroxyl group has been esterified with an acid ester of a polycarboxylic acid and an ethylenically unsaturated monohydric alcohol.

2. A polymer of the mixed ester defined in claim 1.

3. A mixed ester which may be represented as a diester of an ethylidene glycol wherein one of the hydroxyl groups of the ethylidene glycol molecule has been esterified with a saturated monocarboxylic acid containing from 1 to 15 carbon atoms and the other hydroxy group has been esterified with an acid ester of an ethylenically unsaturated dicarboxylic acid containing 2 to 18 carbon atoms and an ethylenically unsaturated monohydric alcohol containing from 3 to 15 carbon atoms.

4. A polymer of the mixed ester defined in claim 3.

5. A mixed ester which may be represented as a diester of an ethylidene glycol wherein one of the hydroxyl groups of the ethylidene glycol molecule has been esterified with an alkanoic acid containing from 1 to 4 carbon atoms and the other hydroxyl group has been esterified with an acid ester of (1) a dicarboxylic acid containing no more than 15 carbon atoms and being selected from the group consisting of acids of the formulae

HOOCRCOOH, HOOCRORCOOH,
HOOCRSRCOOH, HOOCRSORCOOH, and $HOOCRSO_2RCOOH$, wherein R is a bivalent hydrocarbon radical, and (2) an alkenol containing not more than 6 carbon atoms.

6. A polymer of the mixed ester defined in claim 5.

7. A mixed ester which may be represented as a diester of an ethylidene glycol wherein one of the hydroxyl groups of the ethylidene glycol molecule has been esterified with an alkenoic acid containing from 1 to 8 carbon atoms and the other hydroxyl group has been esterified with an ester of (1) a dicarboxylic acid of the formula HOOCRCOOH wherein R is a hydrocarbon radical, and (2) an alkenol containing not more than 6 carbon atoms.

8. A mixed ester which may be represented as a diester of an ethylidene glycol wherein one of the hydroxyl groups of the ethylidene glycol molecule has been esterified with an alkanoic acid containing from 1 to 8 carbon atoms and the other hydroxyl group has been esterified with an acid ester of an alkenedioic acid and an alkenol containing not more than 6 carbon atoms.

9. A polymer of the mixed ester defined in claim 8.

10. Ethylidene acetate allyl maleate.

11. Alpha-acetoxyethyl allyl phthalate.

12. Ethylidene propionate allyl phthalate.

13. A polymer of alpha-acetoxyethyl allyl phthalate.

14. A polymer of ethylidene acetate allyl maleate.

15. A polymer of ethylidene propionate allyl phthalate.

16. An infusible insoluble polymer of ethylidene acetate allyl maleate.

THEODORE W. EVANS.
DAVID E. ADELSON.
LYNWOOD N. WHITEHILL.

REFERENCES CITED

The following references are of record in the file of this patent:

Organic Chemistry, Fieser and Fieser, 2nd ed., Heath & Co., Boston (1950), page 32.